United States Patent
Reuben

(10) Patent No.: US 9,788,605 B2
(45) Date of Patent: Oct. 17, 2017

(54) INSULATED SOLE FOR ARTICLE OF FOOTWEAR

(71) Applicant: Ronie Reuben, Town of Mount Royal (CA)

(72) Inventor: Ronie Reuben, Town of Mount Royal (CA)

( * ) Notice: Subject to any disclaimer, the term of this patent is extended or adjusted under 35 U.S.C. 154(b) by 50 days.

(21) Appl. No.: 14/545,715

(22) Filed: Jun. 10, 2015

(65) Prior Publication Data
US 2016/0360832 A1    Dec. 15, 2016

(51) Int. Cl.
*A43B 13/42* (2006.01)
*A43B 13/12* (2006.01)
*B29D 35/12* (2010.01)
*A43B 13/14* (2006.01)

(52) U.S. Cl.
CPC ............ *A43B 13/42* (2013.01); *A43B 13/125* (2013.01); *A43B 13/141* (2013.01); *B29D 35/122* (2013.01)

(58) Field of Classification Search
CPC ..... A43B 13/42; A43B 13/141; A43B 13/125; B29D 35/122
USPC .............................. 36/25 R, 30 R, 30 A, 3 B
See application file for complete search history.

(56) References Cited

U.S. PATENT DOCUMENTS

| | | | | |
|---|---|---|---|---|
| 333,595 A * | 1/1886 | Butterfield | ........... | A43B 13/223 36/30 R |
| 1,559,532 A * | 10/1925 | Smith | ................... | A43B 13/181 36/28 |
| 1,966,719 A * | 7/1934 | Hartl | ...................... | A43B 13/38 12/146 BP |
| 2,560,120 A * | 7/1951 | Miller | ..................... | A43B 17/00 36/147 |
| 2,620,574 A * | 12/1952 | Pepperman, Jr. | ......... | A43B 7/14 36/14 |
| 3,050,875 A * | 8/1962 | Robbins | .................... | A43B 7/06 36/3 B |
| 3,087,262 A * | 4/1963 | Russell | ................. | A43B 13/181 36/28 |
| 3,205,595 A * | 9/1965 | Funck | .................... | A43B 7/081 36/147 |
| 4,129,951 A * | 12/1978 | Petrosky | ............... | A43B 13/203 36/29 |
| 4,229,889 A * | 10/1980 | Petrosky | ............... | A43B 13/203 36/28 |
| 4,376,344 A * | 3/1983 | Kimsey | .................... | A43B 3/16 12/142 R |
| 4,397,104 A * | 8/1983 | Doak | ................... | A43B 13/203 36/29 |
| 4,658,515 A * | 4/1987 | Oatman | ................. | A43B 17/14 36/2.6 |
| 5,134,790 A * | 8/1992 | Woitschaetzke | ...... | A43B 1/0009 36/28 |

(Continued)

*Primary Examiner* — Clinton T Ostrup
*Assistant Examiner* — Bao-Thieu L Nguyen
(74) *Attorney, Agent, or Firm* — Houle Patent Agency Inc.

(57) ABSTRACT

An insulated sole having down feather insulation held captive therein and method of fabrication is described. The sole is formed with open top end cavities in which there is disposed down feathers or mixtures thereof to capture and retain heat. A membrane seals the open top end of the cavities. The insulated sole is used in the fabrication of articles of footwear for use in cold weather climate to resist to the cold emanating from the ground to shield against heat loss from the wearer's feet.

10 Claims, 2 Drawing Sheets

(56) References Cited

U.S. PATENT DOCUMENTS

| | | | | |
|---|---|---|---|---|
| 5,396,719 | A * | 3/1995 | Crawford, III | A43B 13/38 36/108 |
| 5,839,208 | A * | 11/1998 | Huang | A43B 13/20 36/28 |
| 6,025,041 | A * | 2/2000 | Reuben | A47G 9/0207 428/15 |
| 6,266,896 | B1 * | 7/2001 | Liu | A43B 13/14 36/28 |
| 6,305,099 | B1 * | 10/2001 | Chu | A43B 7/08 36/29 |
| 6,655,048 | B2 * | 12/2003 | Moretti | A43B 7/125 36/29 |
| 6,775,926 | B1 * | 8/2004 | Huang | A43B 7/081 36/3 B |
| 6,948,260 | B2 * | 9/2005 | Lin | A43B 7/081 36/3 B |
| 6,973,742 | B2 * | 12/2005 | Gordon | A43B 1/00 36/11 |
| 6,976,319 | B2 * | 12/2005 | Pfander | A43B 1/0009 36/3 B |
| 7,152,342 | B2 * | 12/2006 | Sommer | A43B 13/189 36/25 R |
| 7,752,776 | B2 * | 7/2010 | Farnworth | A43B 7/34 2/458 |
| 7,805,859 | B2 * | 10/2010 | Finkelstein | A43B 13/187 36/153 |
| 7,992,323 | B2 * | 8/2011 | Lin | A43B 17/08 36/3 B |
| 9,078,493 | B2 * | 7/2015 | Bradford | A43B 13/145 |
| 9,392,845 | B2 * | 7/2016 | Hazenberg | A43B 1/0009 |
| 2004/0163277 | A1 * | 8/2004 | Saiz Zapata | A43B 7/08 36/3 B |
| 2005/0217140 | A1 * | 10/2005 | Melis | A43B 7/081 36/3 B |
| 2005/0241180 | A1 * | 11/2005 | Squadroni | A43B 7/081 36/3 B |
| 2008/0066341 | A1 * | 3/2008 | Hottinger | A43B 3/108 36/28 |
| 2008/0229484 | A1 * | 9/2008 | Baychar | A41D 31/0038 2/272 |
| 2009/0013558 | A1 * | 1/2009 | Hazenberg | A43B 1/0009 36/88 |
| 2009/0031586 | A1 * | 2/2009 | Adelchi | A43B 7/06 36/103 |
| 2010/0186259 | A1 * | 7/2010 | Garza | A43B 1/0081 36/101 |
| 2011/0265352 | A1 * | 11/2011 | Lin | A43B 7/088 36/3 B |
| 2015/0079353 | A1 * | 3/2015 | Gordon | A43B 7/02 428/172 |

* cited by examiner

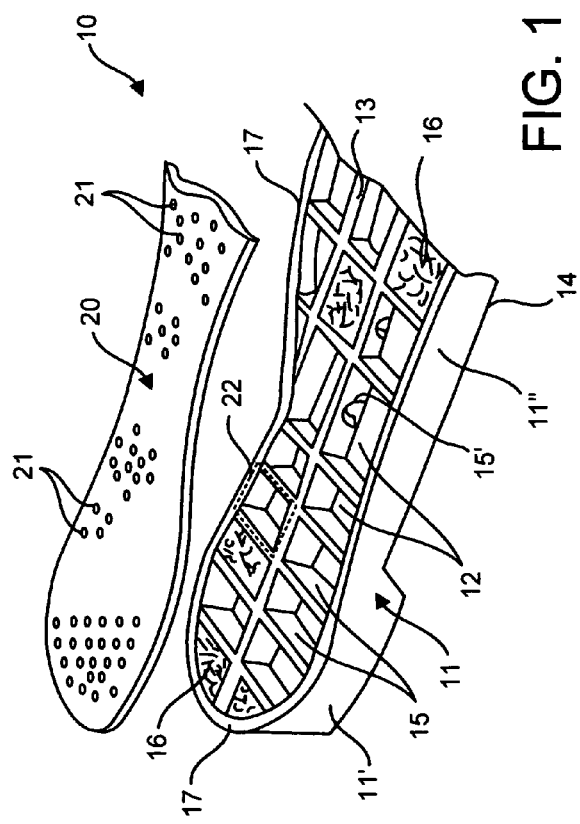
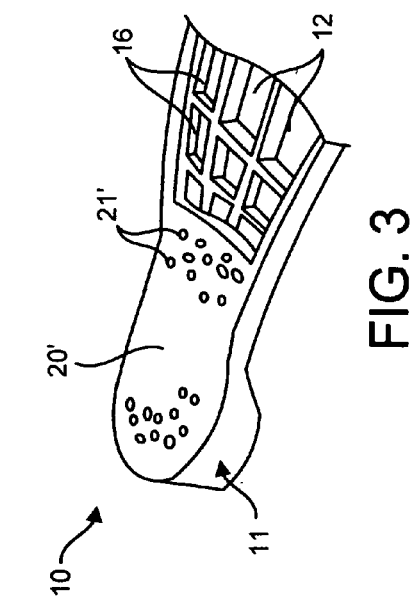
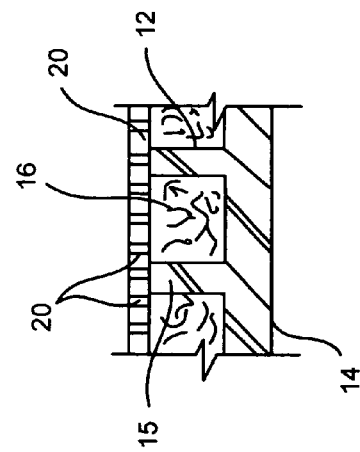
FIG. 1
FIG. 2
FIG. 3

INSULATED SOLE FOR ARTICLE OF FOOTWEAR

TECHNICAL FIELD

The present invention relates to an insulated sole for use in the fabrication of an article of footwear, and particularly, but not exclusively, to an article of footwear for use during cold weather conditions.

BACKGROUND OF THE INVENTION

Various articles of footwear structures are known for use during cold weather conditions and most of these consists in the insulation of the upper of the article of footwear. The sole structure usually consists of a solid structure and an insulating insole, such as "THINSULATE"™(fiber insulation), a registered trademark of the 3M Corporation, is disposed thereover inside the article of footwear for use as a barrier between the cold sole and the wearer's feet. This provides minimal resistance against the transfer of the cold emanating from the ground through the sole and to the feet of the wearer person. It is known that a major part of cold feet is caused by the sole of the article of footwear which is not capable of resisting to the cold emanating from the ground and thereby resulting in major heat loss incurring from the wearer's feet. The risk of frostbite on any exposed skin can have a lasting effect on the sensory nerves of the foot, especially the toes. Keeping a thermal buffer between one's foot and the frozen ground is very important as a significant amount of body heat can be lost through one's feet. It would therefore be desirable to create soles that are more thermally efficient to buffer the cold emanating from the ground and provide the wearer person comfort to its feet while maintaining breathability and comfort during cold weather conditions.

It is known that the sole of a shoe deforms less during cold weather conditions due to an increase in stiffness resulting in that a smaller area of a wearer's foot is in contact with the shoe insole during impact of the sole of the shoe with the ground surface. This results in more localized pressure on the foot and putting more pressure or impact force on a smaller area of the foot, much like running on a hard surface. It would therefore be desirable to construct an article of footwear with a sole providing more flexibility, better impact absorbing, lightweight and better insulation properties during cold weather conditions.

Down insulation from duck and goose feathers is known as an excellent insulator due to its superior heat retaining properties. However, down is difficult to handle during manufacturing of products containing down. My U.S. Pat. No. 6,025,041 addresses this problem and resolves it by the construction of down feather sheets in which the down is held captive in a substantially evenly distributed form. It would therefore also be desirable to use down in the construction of the sole of article of footwear to provide insulation therein.

SUMMARY OF THE INVENTION

It is therefore a feature of the present invention to provide an insulated sole for an article of footwear which provides the above mentioned desires and overcomes some of the problems associated with soles of articles of footwear adapted to be worn during cold weather conditions.

Another feature of the present invention is to provide an insulated sole having cavities in an inner surface thereof and wherein down insulation is disposed in such cavities and trapped therein to provide a thermal insulating barrier and comfort to the user's feet.

Another feature of the present invention is to provide a method of manufacturing an insulated sole for an article of footwear using down insulation or a mixture thereof.

According to the above features, from a broad aspect, the present invention provides an insulated sole for an article of footwear. The insulated sole has a ground engaging outer surface and an inner surface. A plurality of cavities are formed in the inner surface. Down insulation or a mixture thereof with a material having insulating properties is disposed in each of the cavities and a membrane is disposed over the cavities to trap the down insulation or a mixture thereof therein to provide a thermal insulating barrier.

According to another broad aspect of the present invention there is provided a method of fabricating an insulated sole for an article of footwear. The method comprises the steps of molding a sole from a moldable material with the sole defining a ground engaging outer surface and an inner surface having a plurality of open top end cavities. The cavities are filled with down insulation or a mixture thereof. A membrane, shaped to the contour of the sole, is secured over the cavities to trap the down insulation or a mixture thereof in the cavities to form a thermally insulating sole.

DESCRIPTION OF THE DRAWINGS

A preferred embodiment of the present invention will now be described with reference to the accompanying drawings in which:

FIG. 1 is a partly fragmented perspective view illustrating the construction of the thermally insulated sole of the present invention;

FIG. 2 is a fragmented cross-section view illustrating the sole construction with down feathers held captive in cavities formed in the sole and the breathability of the down trapped in the cavities;

FIG. 3 is a further fragmented perspective view illustrating a modification to the construction of the thermally insulated sole of the present invention;

DESCRIPTION OF THE PREFERRED EMBODIMENT

Figure 4:
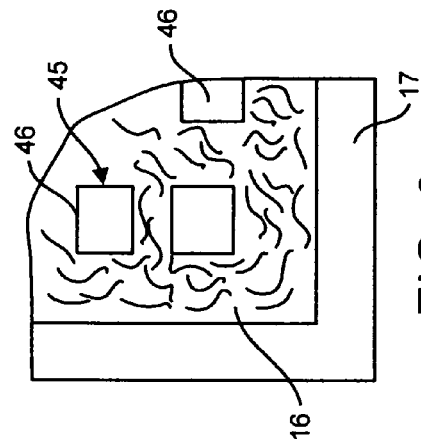
FIG. 4 is a fragmented top view illustrating a modification of the vertical supports as being vertical support posts, instead of walls.

Referring now to the drawings, and more particularly to FIGS. 1 and 2, there is shown generally at 10 the construction of the thermally insulated sole of the present invention for use in the fabrication of articles of footwear adapted for cold weather conditions to provide thermal comfort to a use's feet. As shown, an outer sole 11 is molded from moldable waterproof material such as rubber or suitable moldable plastic, such as polyurethane of proper density with cavities 12 being formed in an inner surface 13, herein the top inner surface, of the sole. The bottom surface 14 of the outer sole 11 is formed as a flat surface or with ground engaging ribs, not shown, depending on the use of the article of footwear to which the sole is to be used.

As shown in FIGS. 1 to 3, the cavities 12 are delineated by surrounding vertical support walls 15. The support walls 15 as herein shown have flat top surfaces extending in a foot support plane and are disposed transverse to one another and are interconnected at their crossings. The vertical support walls 15 may have openings 15' therein for the passage of air between the cavities 12. An outer contour edge 17 is formed about the sole 11 and its top surface and the top surface of the vertical support walls 15 forms the inner surface 13 of the sole. Cavities 12 are distributed throughout the sole 11 in the heel portion 11', where the cavities 12 are deeper due to the fact that the heel portion 11' is thicker, and in the forward foot portion 11" where the cavities are more shallow. Down insulation 16, consisting of duck or goosed down or mixtures thereof or mixtures including feathers, or suitable polymer fibers is contained in each of the cavities 12. FIG. 1 illustrates the down disposed in only a few of the cavities to better illustrate the construction of the thermally insulated sole, but it is to be understood that the down insulation is disposed in all of the cavities 12.

Figure 6:
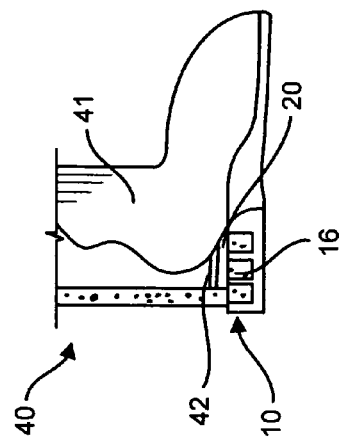
FIG. 6 is a fragmented top view illustrating the various steps in the method of fabricating the thermally insulated sole of the present invention.

FIG. 6 shows another modification of the vertical supports wherein instead of walls 15 the supports are constituted by spaced apart support posts 45 having a flat top surface 46 lying in a common foot support plane together with the outer contour edge 17. The down insulation 16 is disposed in the cavity area surrounding the posts 45.

The down insulation 16 is held captive in the cavities 12 by a membrane, herein a sealing insole 20, provided with holes 21 therein for breathability of the down to trap heat generated from the feet of a wearer person. The membrane 20 may also have thermally conductive fibers or consist of material having thermal conductivity to distribute heat from the user's feet. This sealing insole 21 is formed of a suitable material having a certain rigidity to maintain its shape and provide comfort to the wearer's feet. The membrane 20 is herein glued to the inner surface 13 of the sole 11 by the application of glue 22 on the top surface of the vertical support walls 15 and the contour edge 17 by the use of a roller applicator or other suitable means.

FIG. 3 illustrates another example of the construction of the thermally insulated sole 10 of the present invention. As herein illustrated, a perforated membrane 20', or a solid membrane shaped to the underfoot and formed of fusible material, is fused over the inner surface 13 of the soles 11 in a further molding step with the holes 21' being pre-formed in the membrane.

Figure 5:
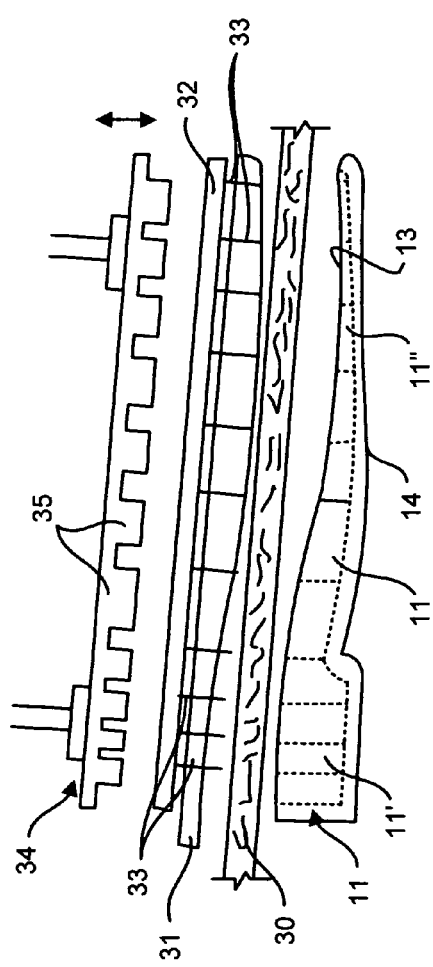
FIG. 5 is a simplified side view illustrating a method of fabricating the thermally insulated sole of the present invention.

Referring now to FIGS. 5 and 6, there is described the method of fabricating the insulated sole 10 of the present invention using the support walls of FIGS. 1 to 3. Firstly, the sole 11 is molded in a molding process of a type well known in the art to form the sole 11 with cavities 12 as illustrated in FIG. 1. The cavities are rectangular shaped to facilitate mold construction. To disposed the down insulation into the cavities 12, a down feather sheet 30, such as the type described in my previously mentioned U.S. Pat. No. 6,025,041, is positioned over the inner surface 13 of the sole 11 and held in contact with the inner surface by a holding plate 31 shaped to clamp the down feather sheet 30 evenly over the inner surface 13 of the sole. A die cutting plate 32 having a pattern of cutting knives 33 is then brought down on the feather sheet 30 to cut down insert pieces 39 shaped to fit in adjacent cavities 12. A pusher plate 34, having a pattern of pusher blocks 35, is then actuated to push the down insert pieces into their adjacent cavities 12. The sole 11, now having its cavities 12 filled with down insulation, is moved to another station where the membrane 20 or 20' is secured over the inner surface 13 of the sole 11 by gluing or fusing as above mentioned, to trap the down in the cavities. Because down has excellent shape restoring characteristics, any compression of the down is automatically restored when the compression force is released.

Figure 7:
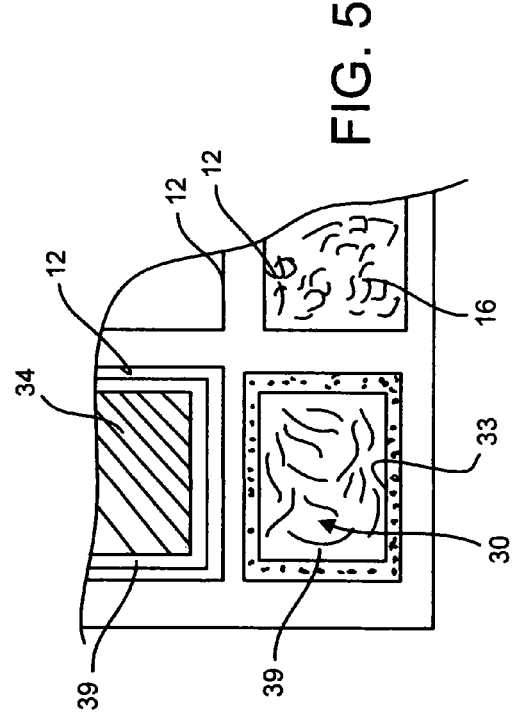
FIG. 7 is a fragmented side view showing a cold weather article of footwear incorporating in its construction the thermally insulated sole of the present invention.

FIG. 7 illustrates an article of footwear 40 fabricated with the thermally insulated sole 10 of the present invention. As shown, an upper 41 is secured on the sole 10 and is herein insulated with the down insulated sheet of my previous invention. Accordingly, insulation is provided all about the upper of the article of footwear. An upper insole 42 is also shown disposed over the membrane 20 to provide added comfort and insulation, such as the "THINSULATE"™, (fiber insulation), insole of the 3M Company. The article of footwear 40 as illustrated substantially completely surrounds a wearer's feet with thermally insulating down to provide comfort to the user's feet during cold weather conditions.

As can be appreciated, the insulated sole of the present invention provides several advantages to the sole. The sole provides a thermal barrier to act as a buffer to cold emanating from the ground. It can also act as a buffer the heat with its ability to cool. The cavities and supports also provides more flexibility, shock absorbing, and light weight.

It is within the ambit of the present invention to include any obvious modifications of the preferred embodiment described herein, provided such modifications fall within the scope of the appended claims.

The invention claimed is:

1. An outer insulated sole for an article of footwear, said outer insulated sole being molded from waterproof material, said waterproof material selected from rubber or a moldable plastic, said outer insulated sole having a ground engaging outer surface and an inner surface, a plurality of cavities formed in said inner surface, and down insulation or a mixture of down insulation with a material having insulating properties which is disposed within said cavities, said cavities being delineated by spaced apart vertical support walls or support posts, said vertical support walls or support posts having flat outer surfaces which acts as an insole for sealing the insole over said cavities on said flat outer surfaces to trap said down insulation or said mixture of down insulation with a material having insulating properties in said cavities; said down insulation or said mixture of down insulation with a material having insulating properties providing a thermal insulating barrier to act as a buffer, between said ground engaging outer surface and said inner surface.

2. The outer insulated sole as claimed in claim 1 wherein said insulated sole is molded from waterproof material.

3. The outer insulated sole as claimed in claim 1 wherein said waterproof material is rubber or said moldable plastic comprises polyurethane which is capable of flexing.

4. The outer insulated sole as claimed in claim 1 wherein said insole has holes therein for breathability of the down insulation or said mixture of down insulation with a material having insulating properties to absorb and distribute heat generated from the feet of a wearer, when worn.

5. The outer insulated sole as claimed in claim 1 wherein said insole is a rubber or plastic material sheet shaped to the contour of said outer insulated sole and fused or adhesively secured over a top surface of a plurality of said vertical support walls.

6. The outer insulated sole as claimed in claim 1 wherein said vertical support walls are straight transverse parallel support walls which are interconnected at their crossings to form said cavities therebetween.

7. The outer insulated sole as claimed in claim 1 wherein said cavities are recessed from a contour edge of said outer insulated sole, said cavities being disposed in a frontal foot portion and a heel portion of said outer insulated sole, at least some of said vertical support walls having openings therein for the passage of air between the cavities to distribute heat retained by the down insulation or said mixture of down insulation with a material having insulating properties disposed in said cavities.

8. The outer insulated sole as claimed in claim 1 wherein said down insulation is duck or goose down insulation or a mixture of duck and goose down insulation or a mixture of duck or goose down insulation and synthetic fibers which are distributed throughout the cavities of said insulated sole.

9. The outer insulated sole as claimed in claim 1 wherein said article of footwear is a winter article of footwear and said outer insulated sole substantially reduces heat loss when worn.

10. The outer insulated sole as claimed in claim 9 further comprising an upper insole to provide comfort and insulation, to a wearer.

\* \* \* \* \*